Sept. 15, 1936.  C. R. SKINNER  2,054,451
FILM DRIVE
Filed May 20, 1935
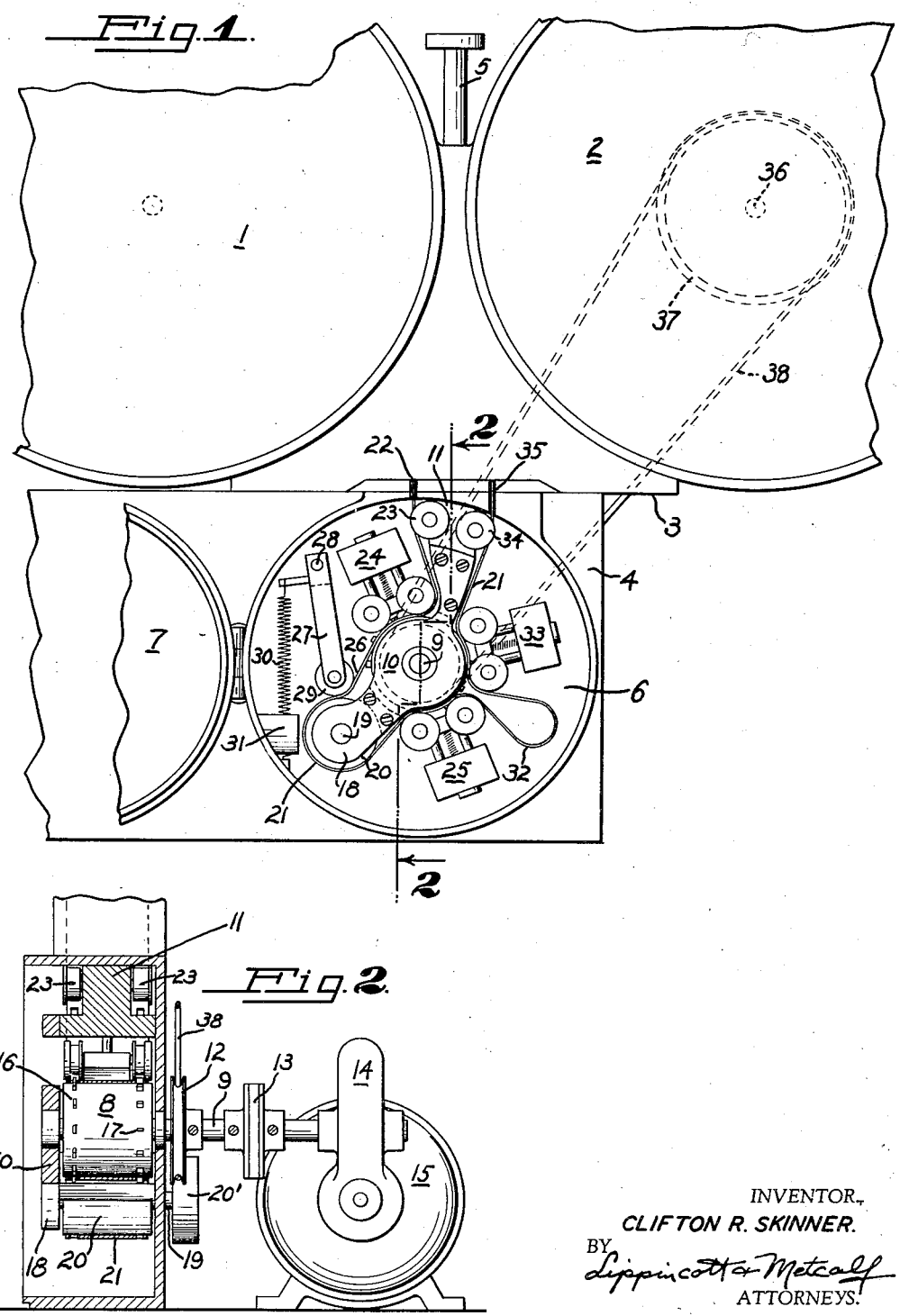
INVENTOR.
CLIFTON R. SKINNER.
BY
Lippincott & Metcalf
ATTORNEYS.

Patented Sept. 15, 1936

2,054,451

UNITED STATES PATENT OFFICE 2,054,451

FILM DRIVE

Clifton R. Skinner, San Francisco, Calif.

Application May 20, 1935, Serial No. 22,487

8 Claims. (Cl. 271—2.3)

My invention relates to a film drive, and more particularly to a means and method of moving motion picture film upon which sound is photographically or otherwise recorded at uniform and constant speed.

Among the objects of my invention are: To provide a recording film drive utilizing a single sprocket; to provide a compact and portable film drive; to provide a recording film drive having a substantially constant speed; to provide a recording film drive wherein jerks due to magazine irregularities are eliminated; to provide a method and means for isolating the recording portion of a film from irregularities inherent in a complete system; and to provide a simple and efficient means and method of driving a film at a uniform speed.

Other objects of my invention will be apparent or will be specifically pointed out in the description forming a part of this specification, but I do not limit myself to the embodiment of the invention herein described, as various forms may be adopted within the scope of the claims.

In the drawing, Figure 1 is a side view in plan of a portion of a film recorder wherein the light-proof door is open to show the sprocket mechanism.

Figure 2 is a view partly in section and partly in elevation, taken along a series of connected planes as indicated by the line 2—2 in Figure 1.

In the recording of sound on film, the main difficulty, aside from the linearity of the light valve or equivalent device which is used to modulate the light thrown on the film, has been to provide a film drive which will give to the film a constant speed with very small limits of variation.

There are a number of factors which contribute to the irregularity of film motion. In itself, the driving sprocket is one contributing factor in that it is provided with sprocket teeth which engage with the usual perforations in the picture film, in order that the film may be positively progressed. These sprocket teeth by catching or otherwise interfering with the steady progression of the film may cause minute flutters which are highly objectionable; but one of the main factors causing irregularity in the motion of the film is the take-up device which is used to reel up the film after exposure. The exposed film is usually reeled into a closed magazine.

Inasmuch as it is quite desirable in most cases that the exposed film be rolled fairly tightly upon itself and all slack eliminated which might and very often does cause a film jam if such slack occurs, it is necessary to use some type of over-drive on the reeling mechanism. The customary procedure is to use a slipping friction clutch between the positive driving means and the means for reeling up the exposed film.

When the film is first rolled on an empty axle in the receiving magazine, the diameter of the roll is small, and as more and more film is wound on the axle, the diameter of the roll becomes greater and greater. Thus, a drive must be provided for the receiving magazine axle which is sufficiently fast to take up slack at all times, not only when the diameter is small, but also powerful enough to roll up the film when the diameter thereof is large enough to nearly fill the magazine. This means that the drive must slip. The resultant constant slippage of the friction clutch or other means used causes jerks which are transmitted to the film, and if precautions are not taken to eliminate the trouble, it will cause irregular motion at the point where the recording is taking place.

My present invention is primarily concerned with preventing such take-up jerks from reaching the point where recording takes place, and broadly speaking, my invention comprises among other features, the formation of a free loop between the take-up magazine at the point of recording and also the use of other means of taking up irregularities in film speed between the unexposed film magazine and the point of recording.

Hitherto, attempts have been made to use a single sprocket for driving a film for use in recording, but these in general have been unsatisfactory, because the magazine jerks have not been prevented from reaching the recording area. Consequently, most successful film recorders utilize a separate, positively driven sprocket for pulling down the film, and another positively driven hold-back sprocket for controlling the return of the film to the magazine, thus isolating to some degree take-up jerks. Such a recorder, however, requires gears or similar driving connections between the pull-down and hold-back sprockets and the power source which gears in turn contribute to the irregularities present in the film. Thus, one bad feature is eliminated only to gain others. My present invention allows the use of a single sprocket and with complete isolation of the magazine irregularities without the necessity of using extra sprockets. Other broad features of my invention may be more fully understood by reference to the following description of a preferred structure embodying my invention.

Referring directly to Figures 1 and 2, a film magazine, which may be of the type known in the trade as the "Bell and Howell" type and comprises an unexposed film magazine 1 and an exposed film magazine 2, all united into a single casting having a flush bottom face 3, which is adapted to fit accurately a recording casing 4. The magazine is held onto the recorder casing 4 by means of a lock screw 5 passing through the main body of the film casting and entering a tapped hole (not shown) in the recorder casing. The magazines 1 and 2 are light-tight and are usually fitted with screw covers whereby fresh film can be inserted in magazine 2, exposed and returned to magazine 3. The recorder casing is provided with a sprocket chamber 6 which is closed by means of a hinged cover 7, only a part of which is shown, and contains a centrally located main drive sprocket 8. This main drive sprocket is firmly fixed on a main drive shaft 9 which passes through a bearing in the back wall of the casing, and also extends completely through the sprocket 8 to be supported in a bearing in a front bearing plate 10 which in turn is solidly screwed to a division bracket 11 extending from the back of the case. Thus the main drive sprocket is supported in bearings both front and rear.

Immediately back of the case a shaft take-up pulley 12 is positioned on the main drive shaft which then is prolonged to enter a rubber or similar aligning device 13, driven by a worm gear assembly 14, the gears of which are not shown. Power is supplied by a motor 15, preferably synchronous, and adapted to run in step with the photographic camera taking motion pictures of the scene to be recorded.

The main drive sprocket 8 is preferably a large one, having either 36 or 64 teeth although the number of teeth is, of course, optional. I also prefer to shape the teeth differently on each side of the sprocket, a set of narrow teeth 16 being provided on one side of the sprocket and a series of broad teeth 17 being provided on the other side of the sprocket. Teeth 16 are made so that they contact only front and rear of the sprocket holes and teeth 17 are adapted to contact only the sides of the sprocket holes. Thus, any irregularities in sprocket holes tend to become equalized. Any "picking" or interference with the release of the film from the teeth is greatly reduced.

The front bearing plate 10 is extended toward the lower part of the case forming a recording drum bearing arm 18 which forms a front bearing for the shaft 19 of a recording drum 20, this shaft also passing through a bearing in the back wall of the casing to terminate in a fly wheel 20'. This fly wheel, while not excessively heavy, should have sufficient inertia to keep the recording drum 19 steady and to prevent small irregularities in the drive from affecting it. The drum itself is perfectly smooth and has no teeth upon it, being driven solely by the frictional contact of the film.

The remainder of the mechanism may be more easily understood by threading a film 21 around the sprocket. The film previously mounted in the unexposed magazine 1, is drawn out therefrom through an intake slot 22 provided for the purpose and enters the recording chamber 6. It there first passes over a pair of unexposed film guide rollers 23 which are pivoted to the separating block 11. The film is then given a slight bend in order that slight tension may be placed upon the rollers 23 and then engages the top surface of the main drive sprocket 8 and is held against the sprocket by an unexposed film holddown assembly 24. The rollers of this hold-down are slidable toward and away from the sprocket in order that the film may be placed thereunder and are lockable to maintain the film against a series of teeth, preferably three or more. The film then passes around the arc of the main drive sprocket and is wrapped around the recording drum 20, thence back again onto the main drive sprocket, being held thereagainst by a recording hold-down assembly 25, where at least two teeth should be engaged. This holddown is also movable and lockable so that the film may be released from the teeth of the sprocket, or held thereagainst during recording.

The recording drum 20 is positioned away from the main drive sprocket such a distance that there will be a small belly 26 in the film between the unexposed film hold-down assembly 25 and the recording drum. This belly is kept taut by means of an idler assembly 27 mounted on an upper pivot 28, the tension being supplied to an idler roller 29 by an idler spring 30, fastened to the bottom of the casing. Thus, the belly 26 is kept under slight tension, and the resiliency of the idler tends to remove any irregularities progressing along the film toward the recording drum.

At some point near the periphery of the recording drum 20 an objective lens assembly 31 is positioned so that light from a recording light source or light valve (not shown) may be focused on the film in the proper position adjacent one of the sets of sprocket holes.

The film, after passing under hold-down 25, does not continue its wrap around the main sprocket 8, but is thrown into a fairly large loop 32 and then is brought directly back against the periphery of the main sprocket 8 and is held there by a take-up hold-down 33, which releases the film from the top of the sprocket at a point adjacent the point where the film originally contacted the main sprocket. After leaving the sprocket, the film passes over a take-up roller assembly 34 and then through a take-up slot 35 into the receiving magazine 2.

The receiving magazine is provided internally with a central take-up shaft 36 upon which a rewind block is mounted so that it can be positively rotated from outside the magazine by a magazine take-up pulley 37 which is in turn driven by a take-up belt 38 passing over the magazine take-up pulley 37 and the shaft takeup pulley 12. The end of the film is solidly threaded into the rewind block. When the motor 15 is started, the rewind block will be rotated by means of the belt, and will take up the film fed into the magazine by the main sprocket.

As the pulley 37 will run slower and slower as the roll of film upon the rewind block becomes of greater and greater diameter, the belt 38 must necessarily slip and it is this slippage which normally produces an extremely bad variation in film speed.

I have found, that while this irregularity is imparted to the film, and is transmitted along the film, that it is not transmitted to any great extent to the main drive sprocket 8 but continues in the film itself, so that if the film were to be completely wrapped around the main drive sprocket without the use of the loop 32 the irregular motion would reach the recording drum and affect the recording adversely. When, however, the loop 32 is placed in the film, the irregularity is absorbed in the loop and disappears, due to the fact that there is no direct pull of the film on the recording drum 20. The filtering action of this loop has been definitely proved by making recordings where the film is threaded upon the apparatus substantially as shown without the use of the loop 32 and other recordings made with the use of the loop 32. In every case, the recording made by the use of the loop 32 has been immeasurably better than when the loop 32 has been left out. In these tests I have not changed any other factors in the set-up.

This, in my opinion, is conclusive proof that the jerks due to the slipping of the belt are not transmitted to any great extent from the film to the teeth of the main drive sprocket 8, but are actually transmitted in the film alone to the recording area, probably because of a minute motion around the sprocket teeth, a small clearance being necessary.

Thus, I have provided a recorder where incoming film, which is usually rolled accurately and is free running, is isolated from the recording area by an idler, and where the recording area is also isolated from the receiving magazine by the use of a free loop positioned between the receiving magazine and the point where the film track is being recorded. In this way, I am able to obtain recordings using a single drive sprocket, which are fully equal to, if not better than recordings obtainable by the use of a multi-sprocket recorder.

While I have described my apparatus as being incorporated in a separate film drive for sound recording alone, I have also found that the principles as outlined above, if adhered to, will greatly prevent jerking of the film, due to the presence of an intermittent motion in a camera, from reaching the recording area. Therefore, the apparatus that I have described is also ideally adapted for incorporation within a motion picture camera where the picture and the sound track are exposed onto the same film. In this case, film will be exposed, as far as the picture is concerned, before passing onto the main drive sprocket 8, and the sound will be recorded on the drum as described.

It is of course obvious that my invention is not limited to apparatus for the recording of sound, but is equally satisfactory for apparatus for the reproduction of sound in motion picture projectors or for any other uses wherein a uniform projection of film past a given point is desired, such as in television transmitters. It is, therefore, to be understood that all of the above uses are within the scope of the appended claims.

I claim:

1. In a sound recording device having a single driven sprocket, means for holding unexposed film against a portion of the periphery of said sprocket, a freely rotating recording drum adjacent said sprocket around which said unexposed film passes after leaving the sprocket, said film again returning to said sprocket, a second holddown for directing said returning film against a portion of said periphery substantially opposite the portion first contacting said film, means for keeping said unexposed film constantly under tension between said hold-downs, a film receiving magazine, and a third holddown between said magazine and said second holddown, said film being directed away from said sprocket into a free loop between said second and third holddowns.

2. In a sound recording device having a single driven sprocket, means for holding unexposed film against a portion of the periphery of said sprocket, a freely rotating recording drum adjacent said sprocket around which said unexposed film passes under tension after leaving the sprocket, said film again returning to said sprocket, a film receiving magazine having a reeling axle, a friction overdrive rotating said axle, and means for forming a free film loop in said film between spaced peripheral film contacts on said sprocket after said film has returned to said sprocket.

3. In a sound recording device having a single driven sprocket, means for holding unexposed film against a portion of the periphery of said sprocket, a freely rotating recording drum adjacent said sprocket around which said unexposed film passes under tension after leaving the sprocket, said film again returning to said sprocket, means for tightening said film against the periphery of said drum independently of the distance of said drum from said sprocket, a second holddown for directing said returning film against a portion of said periphery substantially opposite the portion first contacting said film, a film receiving magazine, and a third holddown between said magazine and said second holddown, said film being directed away from said sprocket into a free loop between said second and third holddowns.

4. In a sound recording device having a single driven sprocket, means for holding unexposed film against a portion of the periphery of said sprocket, a freely rotating recording drum adjacent said sprocket around which said unexposed film passes under tension after leaving the sprocket, said film again returning to said sprocket, means for tightening said film against the periphery of said drum independently of the distance of said drum from said sprocket, a film receiving magazine having a reeling axle, a friction overdrive rotating said axle, and means for forming a free film loop in said film between spaced peripheral film contacts on said sprocket after said film has returned to said sprocket.

5. A method of recording sound on a film driven by a single sprocket which comprises making three contacts between said film and said sprocket to form two loops, placing the loop first entered by the film under tension and recording thereon, and leaving the other loop free.

6. A method of recording sound on a film progressed from a freely turning storage magazine to a power driven storage magazine by a single sprocket which consists of making three contacts between said film and said sprocket to form two loops, placing one loop under tension and recording thereon, leaving the other loop completely free, and interposing the free loop between the power driven storage magazine and the loop under tension.

7. A method of recording sound on a film progressed from a freely turning storage magazine to a power driven storage magazine by a single sprocket which consists of diverting said film from and to said sprocket into a completely free loop before passing from said sprocket into said power driven magazine, diverting said film again from and to said sprocket into a second loop in advance of said free loop, placing said second loop under tension and recording on the film while tensed in said second loop.

8. A method of recording sound on a film progressed from a freely turning storage magazine to a power driven storage magazine by a single sprocket, which consists of leading said film from said freely turning storage magazine into positive contact with said sprocket, diverting said film from said sprocket and returning it thereto to form a recording loop, placing said recording loop under tension, and recording thereon, again diverting said film from said sprocket and returning it thereto to form a completely free loop, and thereafter directing said film directly into the power driven magazine whereby said free loop is interposed between said latter magazine and said recording loop.

CLIFTON R. SKINNER.